(12) United States Patent
Halabi

(10) Patent No.: US 9,391,955 B2
(45) Date of Patent: Jul. 12, 2016

(54) FIREWALL POLICY CONVERTER

(71) Applicant: Bank of America Corporation, Charlotte, NC (US)

(72) Inventor: Mohamad Halabi, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 156 days.

(21) Appl. No.: 14/295,912

(22) Filed: Jun. 4, 2014

(65) Prior Publication Data

US 2015/0358283 A1    Dec. 10, 2015

(51) Int. Cl.
*H04L 29/06* (2006.01)

(52) U.S. Cl.
CPC .................................. *H04L 63/0227* (2013.01)

(58) Field of Classification Search
None
See application file for complete search history.

(56) References Cited

U.S. PATENT DOCUMENTS

| | | | | |
|---|---|---|---|---|
| 2005/0283823 | A1* | 12/2005 | Okajo | G06F 21/604 726/1 |
| 2006/0021021 | A1* | 1/2006 | Patel | H04L 12/2602 726/13 |
| 2007/0266431 | A1* | 11/2007 | Matsuda | H04L 63/0227 726/13 |
| 2008/0034073 | A1 | 2/2008 | McCloy et al. | |
| 2008/0215518 | A1* | 9/2008 | Matsuda | H04L 63/0263 706/47 |
| 2008/0282335 | A1* | 11/2008 | Abzarian | G06F 9/45512 726/11 |
| 2012/0240186 | A1* | 9/2012 | Yoo | H04L 63/0263 726/1 |

* cited by examiner

*Primary Examiner* — Andrew Nalven
*Assistant Examiner* — Abdulhakim Nobahar
(74) *Attorney, Agent, or Firm* — Banner & Witcoff, Ltd.; Michael A. Springs

(57) ABSTRACT

Methods, computer-readable media, systems and apparatuses for firewall policy system are described. The firewall policy system may include a unified format converter, a firewall policy browser, and a firewall policy converter. The firewall policy converter may convert firewall policies between different configuration formats. A first firewall policy may be received in a first configuration format. The first firewall policy may be converted into a second configuration format, and a command to convert the first firewall policy from the second configuration format into a third configuration format may be received. In response to receiving the command, the first firewall policy may be converted from the second configuration format into the third configuration format. The first firewall policy may be outputted in the third configuration format.

18 Claims, 9 Drawing Sheets

| POLICY NAME | POLICY DEFINITION | RULE COUNT | TARGET GATEWAY |
|---|---|---|---|
| Firewall_Name_1 | nat | 55 | Target_Gateway_1 |
| Firewall_Name_2 | nat | 395 | Target_Gateway_2 |
| Firewall_Name_3 | security | 26 | Target_Gateway_3 |
| Firewall_Name_4 | security | 35 | Target_Gateway_4 |

FIG. 5

| RULE # | SOURCE | DESTINATION | SERVICE | ACTION | TRACK | INSTALL GATEWAY | TIME | COMMENTS |
|---|---|---|---|---|---|---|---|---|
| 1 | Source_name1 | Dest_name1 | ports | drop | log | any | any | none |
| 2 | any | any | UDP | accept | log | any | any | none |
| 3 | Source_name2 | Dest_name2 | Object_hosts1 | accept | log | any | any | none |

FIG. 6

FIREWALL POLICY CONVERTER

BACKGROUND

In various networks, traffic may be regulated between various nodes in the network using firewalls. Firewalls may be established at points in the network to allow or block traffic from passing through the firewalls. Many entities may be providing firewall solutions using different formats and underlying technologies resulting in a plethora of disparate formats and firewall interfaces. Because of the disparate formats and interfaces in use, it is difficult to obtain an overall picture of all of the deployed firewalls.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems and apparatuses for a unified firewall policy system. Aspects of the firewall policy system include a unified format converter, a firewall policy browser, and a firewall policy converter. The firewall policy converter may convert firewall policies between different configuration formats.

In some aspects, a first firewall policy may be received in a first configuration format. The first firewall policy may be converted into a second configuration format, and a command to convert the first firewall policy from the second configuration format into a third configuration format may be received. In response to receiving the command, the first firewall policy may be converted from the second configuration format into the third configuration format. The first firewall policy may be outputted in the third configuration format.

In some aspects, a system may comprise a first access device configured to implement a first firewall having a first configuration format, a second access device configured to implement a second firewall having a second configuration format, and a computing device. The computing device may be configured to receive configuration data of the first firewall in the first configuration format, wherein the configuration data comprises at least one firewall policy rule in the first format. The computing device may be configured to convert the at least one firewall policy rule from the first configuration format to a third configuration format and in response to receiving a command to convert the configuration data of the first firewall to the second configuration format, convert the at least one firewall policy rule from the third configuration format to the second configuration format. The computing device may further be configured to configure the second firewall to implement the at least one firewall policy rule in the second firewall using the at least one rule in the second configuration format.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below.

Other features and advantages of the invention will be apparent from the description, drawings, and claims.

BRIEF DESCRIPTION OF THE DRAWINGS

The present disclosure is illustrated by way of example and not limited in the accompanying figures in which like reference numerals indicate similar elements and in which:

FIG. 5 illustrates an example summary view of a firewall policy browser according to one or more aspects described herein.

FIG. 6 illustrates an example rule details view of a firewall policy browser according to one or more aspects described herein.

DETAILED DESCRIPTION

Figure 1:
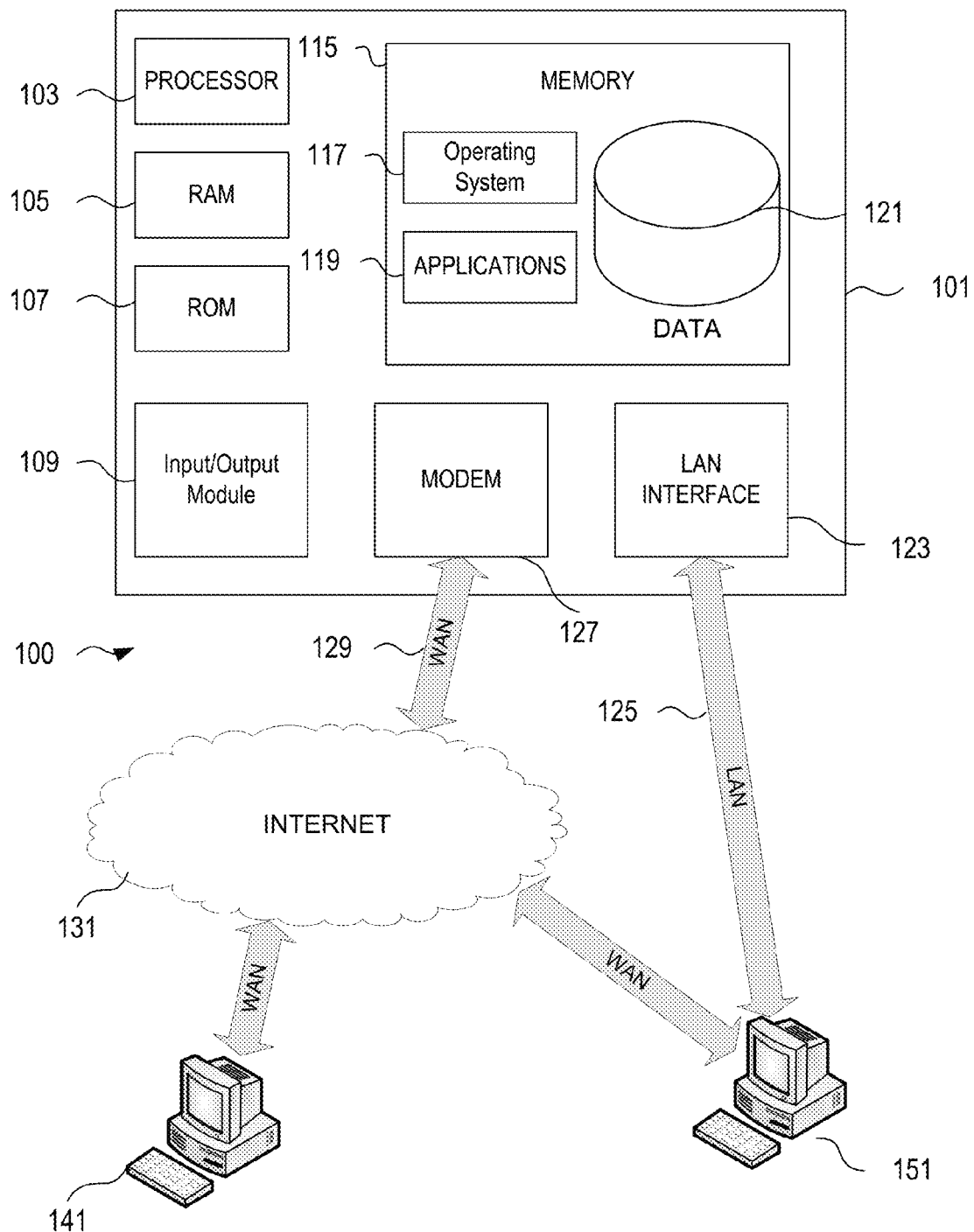
FIG. 1 illustrates an example operating environment in which various aspects of the disclosure may be implemented.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

The present application is related to U.S. patent application Ser. No. 14/295,767 filed on Jun. 4, 2014, entitled "Firewall Policy Browser," and U.S. patent application Ser. No. 14/296,230 filed on Jun. 4, 2014, entitled "Firewall Policy Comparison," which are hereby incorporated by reference herein in their entirety.

It is noted that various connections between elements are discussed in the following description. It is noted that these connections are general and, unless specified otherwise, may be direct or indirect, wired or wireless, and that the specification is not intended to be limiting in this respect.

As will be discussed further below, aspects described herein relate to a unified firewall policy system. A unified firewall policy system may be used to convert the various firewall configuration formats and/or technologies into a unified format (e.g., unified format converter), enable a user (e.g., security administrator) to view some or all of the firewall policies in the unified format (e.g., firewall policy browser), and enable a user to convert between firewalls configured using a first configuration format and/or technology into a second configuration format and/or technology which is not directly compatible with the first configuration format and/or technology (e.g., firewall policy converter).

The unified format converter, firewall policy browser, and firewall policy converter may be implemented in any combination of hardware (e.g., computer processor(s)) and/or software (e.g., a computer application or program). The unified format converter, firewall policy browser, firewall policy converter, and any other aspects disclosed herein may be part of, be packaged with, supplement, be supplemented by, or otherwise be combined or modified with aspects (e.g., a firewall comparison tool) disclosed in U.S. patent application Ser. No. 14/296,230 filed on Jun. 4, 2014, entitled "Firewall Policy Comparison," which is incorporated by reference herein in their entirety.

The unified format may be a format that is different from all of the formats used by any of the firewalls in the system. In another aspect, the unified format may be designated as a configuration format used by one of the firewalls in the network or system. The user may be able to interact with the unified firewall policy system via a user interface which may be a web portal which can be accessed using a web browser. The data, information, and/or user interface may be provided in a format and/or using a protocol compatible with a web browser such as hypertext transfer protocol (HTTP). Examples and arrangements of the firewall policy system will be discussed more fully below.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
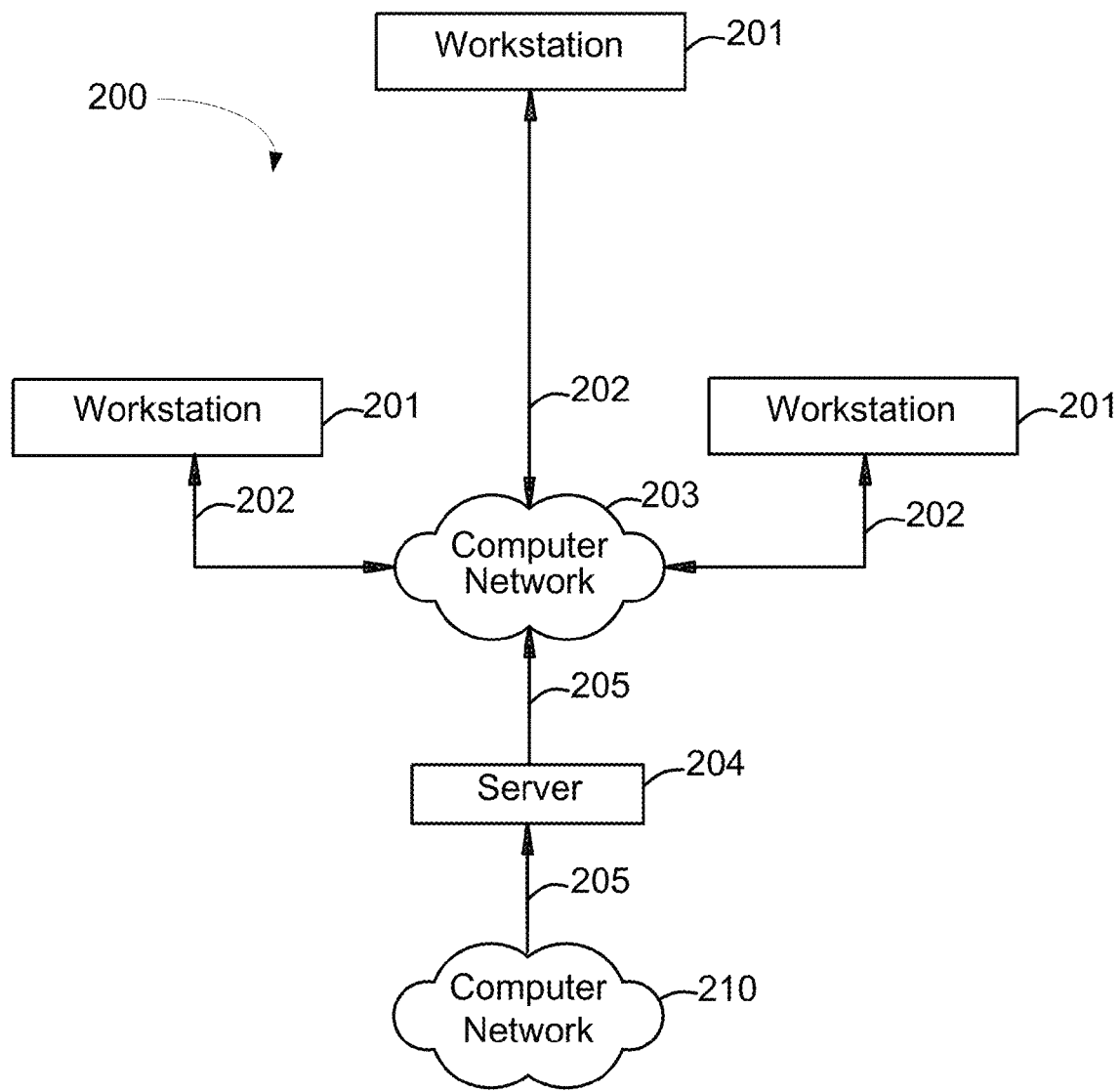
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hardwired links, as well as network types developed in the future, and the like. A virtual machine may be a software implementation of a computer that executes computer programs as if it were a standalone physical machine.

Figure 3:
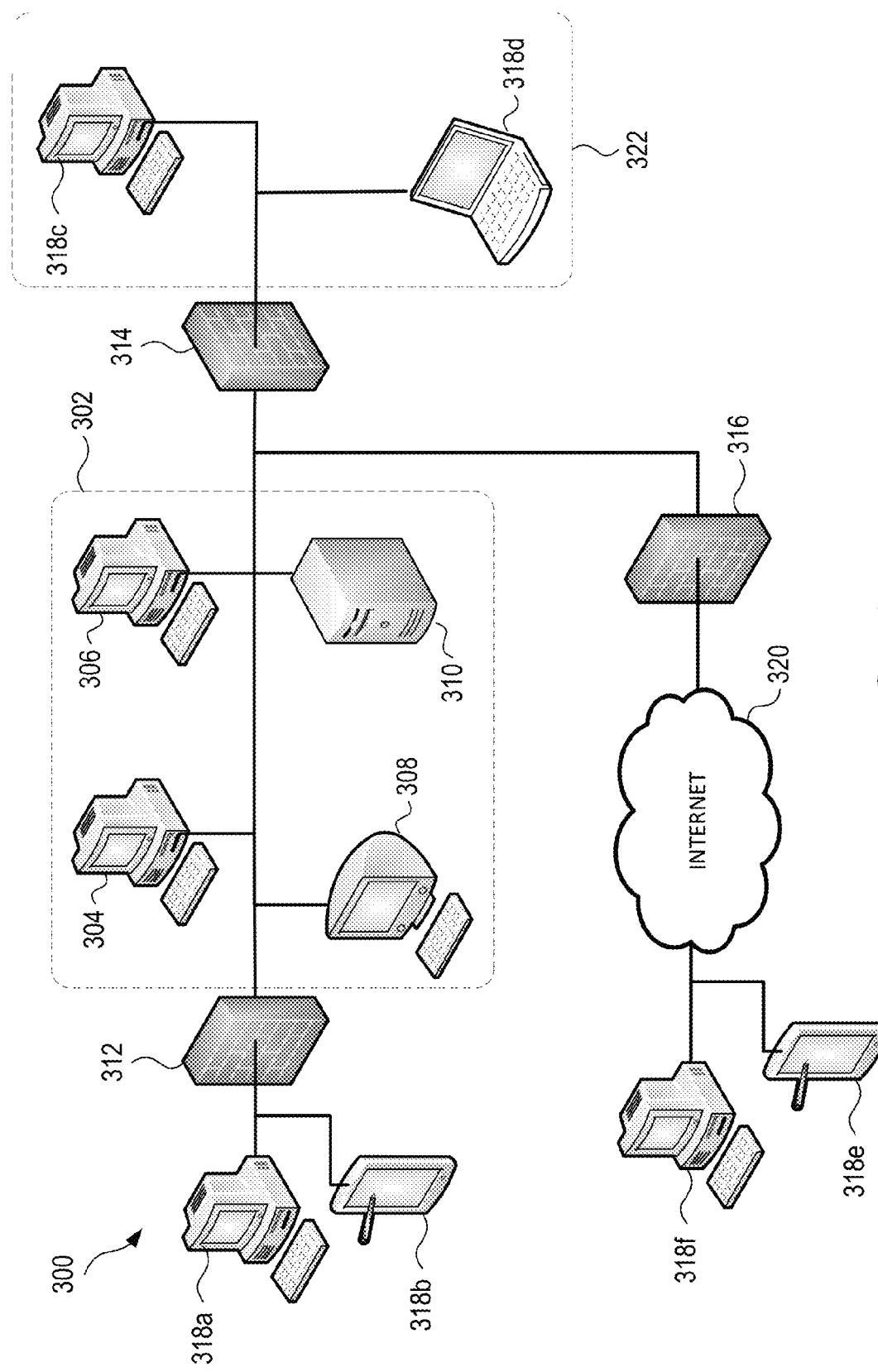
FIG. 3 illustrates an example operating environment including firewalls according to one or more aspects described herein.

FIG. 3 depicts an illustrative network 300 including a group of networked computing devices 302 (computing devices 304, 306, 308, 310) protected from other computing devices 318a-f by firewalls 312, 314, 316. The computing devices 318c, 318d may be another group 322 of networked computing devices operated by the same entity or a different entity as the group 302. The other computing devices may connect to or access the group of networked computing devices 302 via another network (e.g., internet 320). The firewalls may be implemented in one or more access devices such as gateways, routers, bridges, or other routing and/or access controlling devices. The firewalls may be defined by one or more policies which are used in determining which traffic is allowed to pass through the firewall and which traffic is denied access through or blocked by the firewall. The firewall may allow or block traffic in either direction. Each firewall policy may be implemented using one or more rules. Traffic satisfying the conditions of the rule may be processed according to that rule. For example, traffic matching a source, destination, and service defined in a rule may be allowed or blocked in accordance with the action defined by the rule. A rule may include firewall objects which may be parameters in the rule such as internet protocol (IP) addresses, devices, protocols, hosts, and applications.

The different firewalls 312, 314, 316 in the network 300 may use different technologies and use different formats to define the policies of the firewalls. For example, firewall 312 may use a first format in configuring the firewall. Each firewall format may use a different firewall policy viewer dedicated to the particular firewall format. A unified format converter (e.g., parser or parsing module) of the unified firewall policy system may be used to convert the firewall policies in various formats to a unified format, and the unified firewall policy browser may present the firewall policies in the unified format to the user. The unified firewall policy system may be implemented in one or more computing devices such as one or more of the computing devices in the group 302 of networked computing devices.

A user may use a unified firewall policy browser to view all of the firewall policies in the network regardless of the underlying format and/or technology used in the firewalls. Using the firewall policy browser, the user can gain an overall understanding of all the firewalls implemented in a network independent of the format and/or technology of the firewall.

Figure 4:
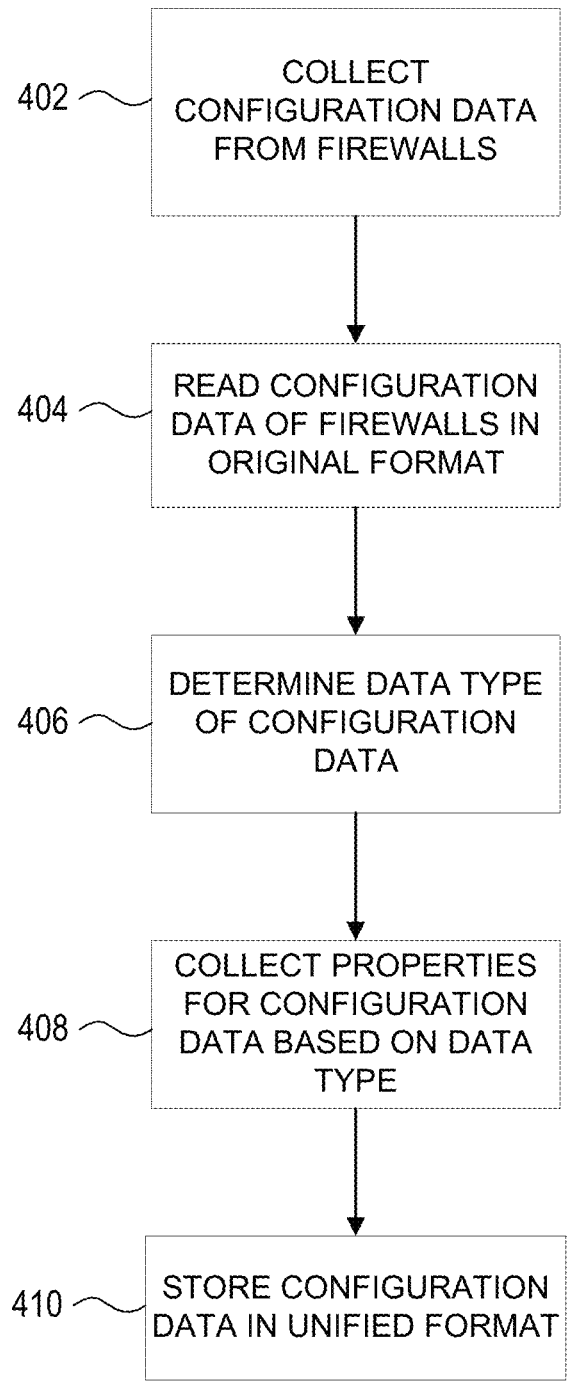
FIG. 4 is an example method according to one or more aspects described herein.

FIG. 4 illustrates an example of a method performed by a unified format converter which may be a parser or parsing module of the unified firewall policy system. At step 402, the parser may collect or retrieve configuration data from the firewalls in their respective original formats. For example, firewall 312 may be implemented using a first technology and/or configuration format which may be specific to the firewall 312. Firewall 314 may use a different technology and/or configuration format from firewall 312 and may be configured using an interface which is different from and incompatible with the technology and/or configuration format used by firewall 312. The original configuration data outputted by firewall 312 may be in the first configuration format. The parser may connect to firewall 312 via a configuration interface of the firewall 312 and obtain a data file containing all of the policies for firewall 312 in the configuration format of the firewall 312 (e.g., a first configuration format). At step 404, the parser may read the configuration data of firewalls in the original format (e.g., the first configuration format). The parser may read and process one configuration item at a time. The data file containing all of the policies may provide different configuration items of the firewall in different lines. The parser may read and process one line of the configuration data file at a time.

At step 406, the parser may determine or identify the data type of the configuration item. The parser may process or parse a line from the data file and determine the data type of the configuration data in the line based on the syntax used for the line. From the syntax of the line, the parser may determine the data type of the configuration item. The data type may be, for example, a policy rule, object, comment, or network. For example, a policy rule in a first configuration format may have specific value types or characters in particular positions in a line. By evaluating the types of values or characters in the configuration item and the positions of the values or characters, the parser can identify the data type of the particular configuration item in the first configuration format and determine the corresponding data type in the unified format. A data type in the first configuration format may be the same data type in the unified format. The format used to present the data type in the first configuration format may be different for the same data type in the unified format.

At step 408, the parser may collect the properties for the configuration item based on the identified data type of the data. Because different data types may have different properties associated with the data type. Depending on the identified data type, the parser may identify different information to collect about the configuration item. For example, if the parser identifies the data type to be a policy rule, the parser may collect the properties of the rule such as the source, destination, service, action, track, install gateway, time, and comment properties associated with the rule. As another example, if the parser identifies the data to be an object such as a source object, the parser may collect the name of the source object and the ports and/or internet protocol (IP) addresses associated with the source object.

At step 410, the parser may store the properties of the data type in a data structure or table in the corresponding property format. The parser may insert the property information into the data structure or table as the parser collects the information from the configuration data. For example, the parser may create a file for the unified format of firewall 312 and create one or more data structures and/or tables in the file corresponding to the properties of the identified data type. After collecting each property of the configuration item, the parser may insert and store the collected property in the appropriate locations of the data structure or table. The data structures or tables may be the same as or similar to the tables shown in FIGS. 5-7 which will be described in more detail.

FIG. 5 shows an example of a summary view 500 of the universal firewall policy browser. The universal firewall policy browser may be used to present the firewall configuration data to the user in the unified format. A user may interact with the viewer to view various levels of the detail about the configuration data. The summary view 500 lists all of the firewall policies and includes fields providing information about each of the firewall policies. The fields in the summary view include policy name 502, policy definition 504, rule count 506, and target gateway 508. The policy name may be the name assigned to the firewall policy. The policy definition may be populated with information relating to the type of firewall policy such as network address translation (NAT) or security. Some policies may be NAT and/or security. The rule count indicates the number of rules that define the firewall policy. The target gateway field provides the names of the one or more gateways or devices where the firewall policy is applied. The name provided in the target gateway field may be associated with a group of gateways. The user may select a firewall policy in the viewer to view the properties of the firewall policy in more detail.

FIG. 6 shows an example of a rule details view 600 of the universal firewall policy browser. Selecting a firewall policy in the view may present the user with a rule details view 600 of the viewer. The rule details view 600 of the viewer may present a table listing all of the rules forming the selected firewall policy and the properties of the rules. The fields in the rule details view 600 for each rule may include a policy name field 502, rule number 608, source 610, destination 612, service 614, action 616, track 618, install gateway 620, time 622, and comments 624. The rule number may be a rule number assigned by the parser as the parser processes the firewall policies in their original formats. The source field 610 may include information regarding the traffic source to which the rule applies. The source field 610 may list a name of an object which may map to an internet protocol (IP) address. Similarly, with the destination field 612, the destination field 612 may include information regarding the traffic destination to which the rule applies. The destination field 612 may list a name of an object which may represent a destination IP address or range of IP addresses. The service field includes information related to the type of service addressed by the rule, for example, an application or a port defined on the firewall. The action field 616 indicates the action taken on traffic meeting the criteria for the rule, specifically, traffic which matches the source, destination, and service. The action taken on the traffic may be to allow or accept the traffic or to block or drop the traffic. The track field 618 indicates whether the rule is configured to log the actions of the rule. The install gateway 620 indicates to which gateways the rule is applied. The time field 622 indicates a time frame (e.g., time of day, expiration date) in which the rule is active. The comments field 624 includes any comments on the rule provided by a user (e.g., firewall administrator). From the rule details view 600, a user can select an object to view properties of the selected object.

Figure 7:
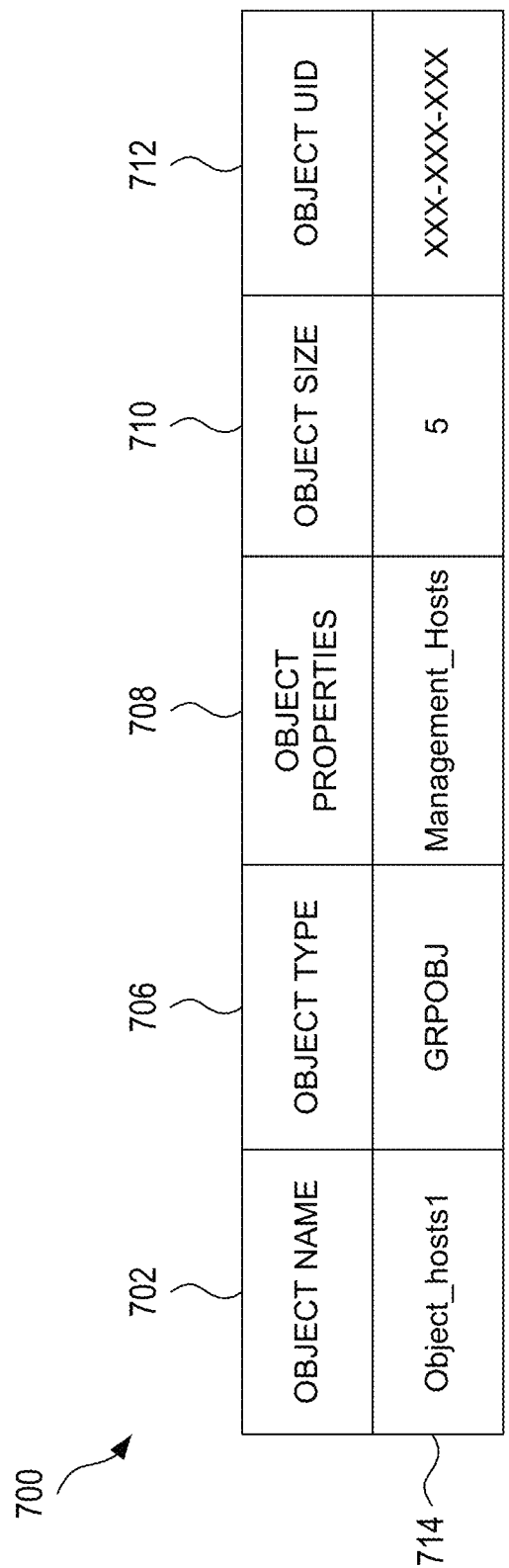
FIG. 7 illustrates an example object properties view of a firewall policy browser according to one or more aspects described herein.

FIG. 7 shows an example of an object properties view 700 of the universal firewall policy browser. The object properties view shows the properties of an object 702 including an object name field 704, an object type field 706, an object properties field 708, an object size field 710, and an object unique identifier (UID) field 712.

Figure 8:
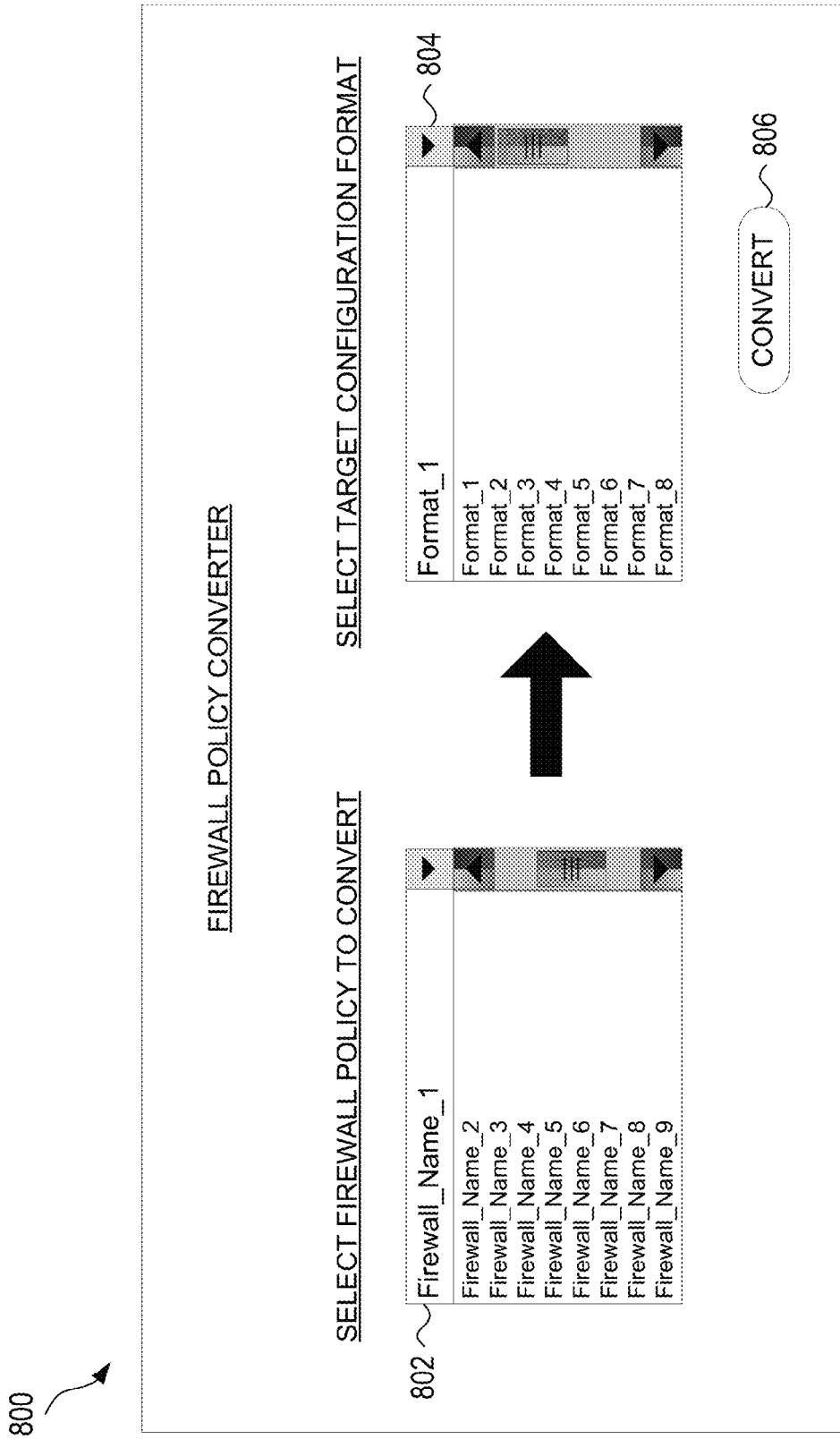
FIG. 8 illustrates an example firewall policy converter user interface according to one or more aspects described herein.

According to another aspect of the unified firewall policy system, the unified firewall policy system may include a firewall policy converter which can be used to convert a firewall policy into a particular target configuration format independent of the original format of the firewall policy. FIG. 8 shows an example of a user interface for a firewall policy converter 800. A firewall policy menu 802 may list all of the firewall policies used in a network and enable a user to select one or more policies from the menu to convert to the target configuration format. A target configuration format menu 804 may list all of the configuration formats used in the network and/or supported by the system. From the target configuration format menu 804, a user can select one or more formats in which the system is to output the selected policies. The user can select the convert button 806 to initiate conversion of the firewall policies to the target configuration formats. The firewall policies may be provided to the user in the form of a configuration file which may be loaded into a firewall configuration interface and/or presented to the user in a screen whereby the user can copy and paste the configuration data into the firewall configuration interface.

Figure 9:
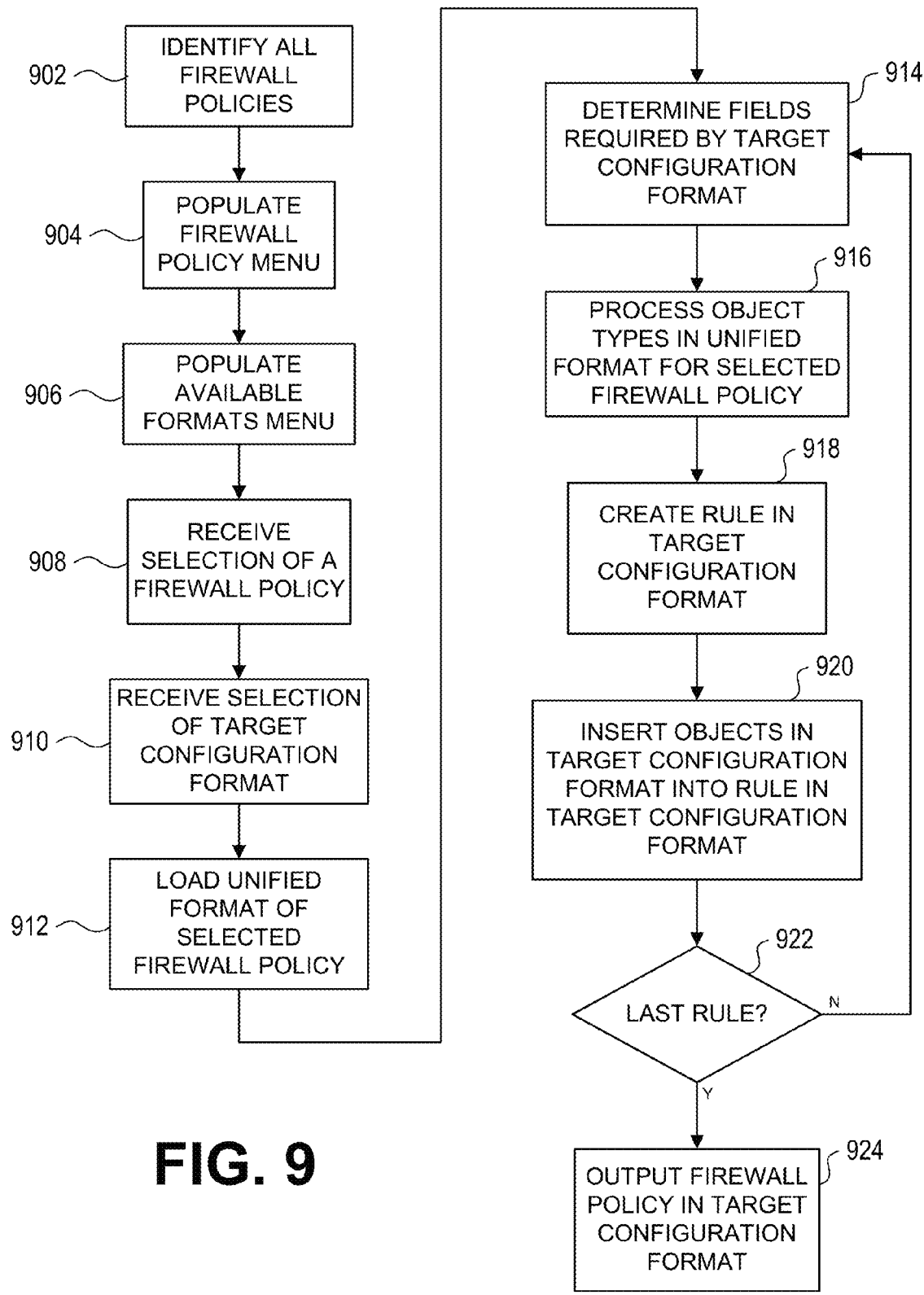
FIG. 9 illustrates an example method of a firewall policy converter according to one or more aspects described herein.

FIG. 9 shows an example of a method of converting a firewall policy to a target configuration format. At step 902, the firewall policy converter may identify all of the firewall policies in the network 300. For example, the firewall policy converter may read all of the stored data of the firewalls in the unified format outputted by the parser. In another aspect, the firewall policy converter may read an index listing all of the firewalls in the network 300.

At step 904, the firewall policy converter may populate a firewall policy selection menu such as the firewall policy selection menu 802 with all of the identified firewalls in the network. At step 906, the firewall policy converter may identify, for example, from an index file or listing all the original firewall formats used in the network 300 and/or all firewall formats supported by the firewall policy converter and populate the available formats menu 804 with the available firewall formats. The firewall policy converter may also determine from the firewall formats used in the network based on available unified format firewall files provided by the parser.

At step 908, the firewall policy converter may receive a selection of a firewall policy, for example, via user interface 800 using menu 802. At step 910, the firewall policy converter may receive a selection of a target configuration format, for example, via user interface 800 using menu 804. At step 912, the firewall policy converter may load the unified format of the selected firewall policy provided by the parser. For example, the firewall policy converter may identify and access the file containing the selected firewall policy configuration data in the unified format provided by the parser. A step 914, the firewall policy converter may determine the fields required by the target configuration format.

At step 916, the firewall policy converter may process object types of the selected firewall policy in the unified format. The firewall policy converter can determine and create object types for the target configuration format corresponding to the objects in the selected firewall policy. In some instances, an object type in a first configuration format might not have a directly corresponding object in a second configuration format. For example, a first configuration format may enable the use of range type objects which may define a range of addresses, and a second configuration format may not enable the use of a single object to define a range of addresses. The range type object in the first configuration format may be converted into individual network objects in the second configuration format. While different objects may be used, the aggregate network objects in the second configuration format can be equivalent to a single range type object in the first configuration format.

At step 918, the firewall policy converter can create the rules of the selected firewall policy in the target configuration format, and at step 920, insert the target configuration format objects of the selected firewall policy into the target configuration format rules.

At step 922, the firewall policy converter may determine whether all of the rules of the firewall policy have been converted into the target configuration format. If the firewall policy converter determines that there are more rules to convert, steps 914-920 may be repeated for each rule. If the firewall policy converter determines that all of the rules have been converted at step 922, the firewall policy converter may output the firewall policy in the target configuration format at step 924. The firewall policy converter may output the converted firewall policy as an output file which may be loaded via an interface into a firewall. The interface may be an interface specific to the configuration format and/or technology used by the destination firewall. In another aspect, the firewall policy converter may present the data in the target configuration format to the user and enable the user to copy the policy in the target configuration format into the firewall.

While various object types have been used in the examples provided herein, a skilled person would understand that the concepts and aspects described herein may be extended to all object types of a firewall.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A method, comprising:
   identifying a plurality of firewall policies in a network, each identified firewall policy of the plurality of firewall policies having an original firewall configuration format, identifying the plurality of firewall policies including reading stored data associated with the firewall policies in a unified configuration format different from the original firewall configuration format of each firewall policy;
   populating a firewall policy menu with the identified plurality of firewall policies and associated original firewall configuration formats;
   receiving a first firewall policy in a first original firewall configuration format;
   converting the first firewall policy into the unified configuration format;
   receiving a command to convert the first firewall policy from the unified configuration format into a first target configuration format;
   in response to receiving the command, converting the first firewall policy from the unified configuration format into the first target configuration format, the converting further including:
      receiving a selection, from the firewall policy menu, of the first firewall policy;
      receiving a selection, from a target firewall configuration format menu listing the plurality of original firewall configuration formats associated with each firewall policy of the plurality of firewall policies, of the first target configuration format;
      converting the selected first firewall policy from the unified format to the first target configuration format; and
   outputting the first firewall policy in the first target configuration format.

2. The method of claim 1, wherein the first firewall policy comprises firewall objects in at least one rule.

3. The method of claim 2, wherein converting the first firewall policy from the unified configuration format into the first target configuration format comprises:
   accessing configuration data of the first firewall policy in the unified configuration format;
   identifying the firewall objects of the first firewall policy in the unified configuration format;
   creating the firewall objects in the first target configuration format; and
   creating the at least one rule of the first firewall policy in the first target configuration format.

4. The method of claim 3, further comprising:
   inserting the firewall objects in the first target configuration format into the at least one rule in the first target configuration format.

5. The method of claim 1, further comprising:
   receiving a second selection, from the firewall policy menu, of a second firewall policy to convert into a second target firewall configuration format;
   receiving a second selection, from the target firewall configuration format menu, of a fourth configuration format as the second target firewall configuration format;
   accessing configuration data of the second firewall policy in the unified configuration format; and
   converting the second firewall policy from the unified configuration format to the second target configuration format.

6. The method of claim 5, further comprising:
receiving a command to convert the selected second firewall policy from the unified configuration format into the second target configuration format.

7. The method of claim 1, wherein outputting the first firewall policy in the first target configuration format comprises outputting a file comprising the first firewall policy in the first target configuration format, wherein the file is configured to be loaded into a firewall having the first target configuration format via an interface of the firewall.

8. A non-transitory computer-readable storage medium storing computer-executable instructions that, when executed by a computing device, cause the computing device to:
identify a plurality of firewall policies in a network, each identified firewall policy of the plurality of firewall policies having an original firewall configuration format, identifying the plurality of firewall policies including reading stored data associated with the firewall policies in a unified format different from the original firewall configuration format of each firewall policy;
populate a firewall policy menu with the identified plurality of firewall policies and associated original firewall configuration formats;
receive a selection, from the firewall policy menu, of a firewall policy to convert into a first target firewall configuration format, the selected firewall policy having a first configuration format as an original format of the selected firewall policy and comprising at least one rule;
receive a selection, from a target firewall configuration format menu listing the plurality of original firewall configuration formats associated with each firewall policy of the plurality of firewall policies, of a second configuration format as the first target firewall configuration format;
convert the selected firewall policy from the first configuration format into the unified configuration format;
convert the selected firewall policy from the third unified configuration format into the first target configuration format; and
present the selected firewall policy to a user in the first target configuration format.

9. The non-transitory computer-readable storage medium of claim 8, wherein the computer-executable instructions, when executed, further cause the computing device to:
identify all firewall policies implemented in the network; and
populate the firewall policy menu with all of the firewall policies implemented in the network.

10. The non-transitory computer-readable storage medium of claim 9, wherein the computer-executable instructions, when executed, further cause the computing device to:
populate the target firewall configuration format menu with available configuration formats.

11. The non-transitory computer-readable storage medium of claim 9, wherein the selected firewall policy comprises firewall objects in at least one rule.

12. The non-transitory computer-readable storage medium of claim 11, wherein the converting comprises:
accessing configuration data of the selected firewall policy in the unified configuration format;
identifying the firewall objects of the selected firewall policy in the unified configuration format;
creating the firewall objects in the first target configuration format; and
creating the at least one rule of the selected firewall policy in the first target configuration format.

13. The non-transitory computer-readable storage medium of claim 8, wherein the computer-executable instructions, when executed, further cause the computing device to:
receive a command to convert the selected firewall policy from the unified configuration format into the first target configuration format.

14. The non-transitory computer-readable storage medium of claim 8, wherein the computer-executable instructions, when executed, further cause the computing device to:
receive a second selection, from the firewall policy menu, of a second firewall policy to convert into a second target firewall configuration format;
receive a second selection, from the target firewall configuration format menu, of a fourth configuration format as the second target firewall configuration format;
access configuration data of the second firewall policy in the unified configuration format; and
convert the second firewall policy from the unified configuration format to the second target configuration format.

15. The non-transitory computer-readable storage medium of claim 8, wherein presenting the selected firewall policy to a user in the second configuration format further includes:
outputting a file comprising the first firewall policy in the first target configuration format, wherein the file is configured to be loaded into a firewall having the first target configuration format via an interface of the firewall.

16. A system, comprising:
a plurality of devices in a network, each device of the plurality of devices having a firewall policy, each firewall policy of a plurality of firewall policies associated with the plurality of devices having an original firewall configuration format, the plurality of devices including:
a first access device configured to implement a first firewall policy having a first configuration format; and
a second access device configured to implement a second firewall policy having a second configuration format;
a computing device having at least one processor and memory and storing instructions that, when executed by the processor, cause the computing device to:
identify the plurality of firewall policies, each firewall policy being associated with a device of the plurality of devices, the identifying including reading stored data associated with the plurality of firewall policies in a unified configuration format different from the original firewall configuration format of each firewall policy;
populate a firewall policy menu with the identified plurality of firewall policies and associated original firewall configuration formats;
receive a selection, from the firewall policy menu, of the first firewall policy;
convert the first firewall policy rule from the first configuration format to the unified configuration format;
receive a command to convert the first firewall policy from the unified configuration format into the second configuration format;
in response to receiving the command to convert the configuration data of the first firewall policy to the second configuration format, convert the first firewall policy rule from the unified configuration format to the second configuration format; and
output the first firewall policy in the second configuration format.

17. The system of claim 16, wherein the unified configuration format is a configuration format unused by any firewalls in the system.

18. The system of claim 16, wherein converting the first firewall policy from the unified configuration format to the second configuration format comprises:
- access configuration data of the first firewall policy in the unified configuration format;
- identify firewall objects of the first firewall policy in the unified configuration format;
- create the firewall objects in the second configuration format; and
- create at least one rule of the first firewall policy in the second configuration format.

* * * * *